United States Patent [19]

Birkenfeld et al.

[11] 4,171,179
[45] Oct. 16, 1979

[54] APPARATUS FOR LOADING SACKS ARRANGED IN LAYERS

[75] Inventors: Richard Birkenfeld; Peter Aka; Hellmuth Lange, all of Beckum, Fed. Rep. of Germany

[73] Assignee: Maschinenfabrik E. Möllers GmbH & Co., Beckum, Fed. Rep. of Germany

[21] Appl. No.: 882,379

[22] Filed: Mar. 1, 1978

[30] Foreign Application Priority Data

Mar. 25, 1977 [DE] Fed. Rep. of Germany ....... 2713135

[51] Int. Cl.² ............................................. B65G 57/03
[52] U.S. Cl. ...................................... 414/85; 414/564
[58] Field of Search ................... 214/6 DK, 6 P, 6 N, 214/6 G, 89, 91 R

[56] References Cited
U.S. PATENT DOCUMENTS 2,780,340 2/1957 Hynson ............................ 214/6 P X

FOREIGN PATENT DOCUMENTS

1088825 10/1967 United Kingdom ..................... 214/6 K

Primary Examiner—Trygve M. Blix
Assistant Examiner—George F. Abraham
Attorney, Agent, or Firm—Toren, McGeady and Stanger

[57] ABSTRACT

In a loading apparatus, sacks are moved from a supply source along a conveyor to a device which arranges the sacks into a layer. From this device, the layer of sacks is moved over a double conveyor belt structure to a member which loads the layer directly onto a loading surface or onto a previously deposited layer of sacks on the loading surface. To provide continuous operation of the apparatus even when a loading surface is being replaced, the different parts of the apparatus can operate at variable speeds. The double conveyor belt structure which normally moves continuously supplying layers to the loading member, switches to a step-wise movement and stores a number of layers of sacks until the loading surface is replaced and ready to be loaded.

12 Claims, 25 Drawing Figures

APPARATUS FOR LOADING SACKS ARRANGED IN LAYERS

SUMMARY OF THE INVENTION

The present invention is directed to an apparatus for conveying sacks from a supply source, such as a sack-filling machine to a loading surface, such as a truck or a railroad car. The sacks are moved from the supply source, arranged into layers and then moved to a loading member which places the layers directly onto the loading surface or onto layers previously stacked on the surface.

In known apparatus of this kind (German Patent Publications DT-PS Nos. 22 31 495 and 22 31 496) the arrangement of the sacks into layers and the placement of the layers onto the loading surface is carried out by a loading member mounted on a vertically movable supporting rod. The sacks are delivered along a belt conveyor and through a chute to the loading member. The supporting rod carries a frame with a vertical stop plate located along one of its sides and extending across the entire width of a steel plate on which the layer of sacks is arranged. A carriage is provided for longitudinal movement on the frame. The carriage includes the steel plate and reciprocates back and forth between a first position where the sacks are loaded onto the plate and a second position where they are displaced by the transverse movement of a stationary stop member. The chute guides the sacks onto the steel plate on the carriage. In this type of structure when the loading surface is replaced, that is, when a loaded truck is removed and an empty truck is moved into the loading position, the supply source of the sacks must be stopped during the replacement of the trucks. Alternatively, two separate loading devices are required with a deflector for directing the sacks to one or the other of the devices so that continuous operation of the source of sacks can be maintained.

It is the primary object of the present invention to provide an apparatus in which the source of supply of the sacks, such as a sack-filling machine, can be kept in continuous operation without requiring two separate loading devices with the necessary deflector and corresponding control devices.

In accordance with the present invention, an apparatus is provided including a belt conveyor which acts as a storage member for permitting continuous operation of the sack-filling machine during the replacement of the loading surface or member. The storage belt conveyor is positioned between a device which forms the sacks into a layer and another device which receives the layers from the belt conveyor and delivers them onto the loading surface. During normal operation, the belt conveyor continuously delivers the layers of sacks to the loading device. When a loading surface or member is being replaced, however, the storage belt conveyor can be operated in a step-wise manner so that it receives each layer from the device forming the layers of the sacks and stores them one behind the other until the loading surface is in position to restart loading. The operating speed of the loading member can be increased when loading is commenced or it can be adjusted to operate at such a speed that, while appropriately operating the storage belt conveyor in a step-wise manner, the maximum number of layers which can be delivered by the loading member onto the loading surfaces can be accomplished at the same operating speed.

With this arrangement, the conveyor belt acts as a storage member while the loading surface, such as a truck or other vehicle, is replaced. The belt rather than moving continuously, operates in a step-wise manner so that each layer of sacks delivered to it are close together as distinguished from normal operation where a considerable gap exists between adjacent layers. The length of the gap depends on the speed of the conveyor belt and the time required for the formation of a layer in the device which performs such a step. Accordingly, the time period required for replacing the loading surface can be balanced by appropriately dimensioning the length of the conveyor belt.

Another feature of the invention involves the extension of the period for exchanging the loading surface by varying the speed of the belt conveyor and the operating speed of the device arranging the sacks in layers. Alternatively, the speed adjustment can be accomplished by providing a maximum operating speed which is not fully utilized during normal operation.

Accordingly, at the commencement of the replacement of the loading surface, the speed of the belt conveyor is reduced and a longer period is provided for arranging the sacks in a layer. During the changeover period, a smaller number of layers are delivered to the belt conveyor. When a new surface has been positioned to restart the loading operation, only the operating speed of the device for forming layers must be increased with the previous reduction in the speed of the conveyor, the layers of sacks are delivered at shorter intervals and a larger quantity per period of time are supplied to the device for forming layers. In this manner, the sacks can be formed into layers and fed to the belt conveyor at a higher speed.

In supplying the loading surface with layers of sacks from a higher location, it is particularly advantageous if a double belt conveyor is used which is pivoted at its receiving end for movement in a vertical plane. By pivoting the double belt conveyor a vertical movement of the device which places the layers on the loading surface can be coordinated. With this arrangement, it is unnecessary to provide vertical movability for the device which places the layers on the loading surface. Moreover, the pivotal support of the double belt conveyor makes it possible to orient the belt conveyor in a direction opposite to the movement of the sacks in the device which forms the layers with a resultant reduced length for the overall apparatus. As a part of the storage feature of the belt conveyor, one of the belts, preferably the upper belt, is provided with transversely extending stop members spaced apart by a distance corresponding to the length of a layer of sacks in the direction of movement of the conveyor. With such stop members, the individual layers can be positioned in a compact arrangement as they travel toward the loading surface, even if the conveyor belt is steeply inclined in the downward direction. In charging the loading surface along its side, the belt conveyor can be positioned horizontally with a cross-conveyor disposed at its delivery end. In addition, a device can be positioned to receive the layers from the cross-conveyor and arranged to move perpendicularly to it. In such an arrangement, the device for delivering the layers to the support surface can be vertically movable as well as transversely movable relative to the direction in which it receives the layers from the belt conveyor.

To supply the loading surface at its front end, it is recommended to arrange the horizontally disposed belt conveyor with the device for charging the layers to the loading surface so that the combination can be extended over the length of the loading surface and can be moved vertically on a stationary frame to provide the stacking feature.

The device for arranging the sacks into layers can include, in a known manner, see German Patent Publication DT-AS No. 22 06 640, two parallel conveyor tracks fed from the belt conveyor extending from the sack-filling machine. At the downstream end of each conveyor track, displaceable pins are positioned for selectively turning the sacks through 90°. Following the pins is a cross-conveyor with elements extending transversely of the normal conveying direction which can be driven in the same or opposite directions with such elements being divided into two groups and separated by the longitudinal median plane extending in the normal direction of movement of the sacks. In such a device, it is possible to provide a very advantageous and simple formation of wide layers of sacks, for example, so that the layers can be deposited on two pallets disposed next to one another on the loading surface. In forming a layer, the sacks are initially moved sideways away from the longitudinal median axis and then other sacks are moved between them with all of the sacks finally being moved together to form the layer. In such an arrangement additional side pressing plates are required. Furthermore, the discharge of the entire layer in either transverse direction is possible.

The cross-conveying element can be constructed as conveyor belts running around drivable belt pulleys. The pulleys are mounted on support plates which can be raised or lowered between conveyor elements which move in the normal direction for positioning the cross-conveying elements between the operable and inoperable positions.

In one preferred embodiment, the device for charging the layer of sacks to the supporting surface includes a support column vertically movable on a support frame at the downstream or outlet end of the storage belt conveyor. At the lower end of the support column, transversely extending guide rails are provided for a carriage. The carriage is movable over guide rails in a longitudinal direction for receiving a layer of sacks from the belt conveyor. As the layer moves onto the carriage it abuts against a transversely extending stop member fixed to the guide rails.

Another preferred arrangement of the device for placing layers on the loading surface involves a pivotally supported frame at the outlet end of the belt conveyor which is movable in a vertical plane. A support surface is longitudinally movable relative to the frame and a stripping member is provided on the frame by which a layer of sacks received from the belt conveyor can be moved from the support surface as the surface is retracted.

In this arrangement it is advisable to construct the stripping member as a movable part which first pushes the layer onto the support surface when the surface is in its advanced position until the layer reaches a stop fixed to the frame. In this manner, the layer is kept in a tight formation which permits exact placement on the loading surface or on a layer previously moved onto the loading surface.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
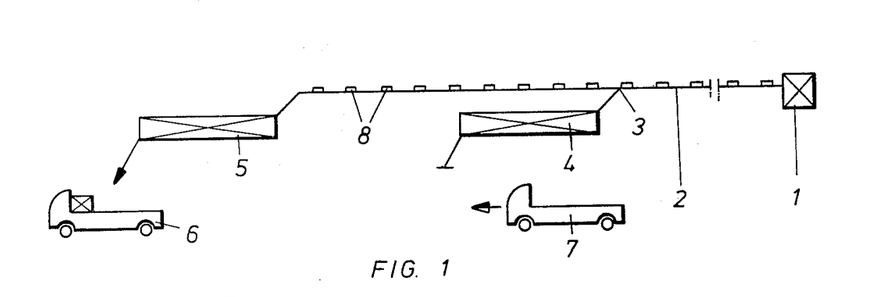
FIG. 1 is a schematic showing of an apparatus illustrating the prior art with a sack-filling machine supplying sacks along a belt conveyor to two loading heads with one of the heads loading a truck while the other head remains out of service while the truck is being replaced.
Figure 2:
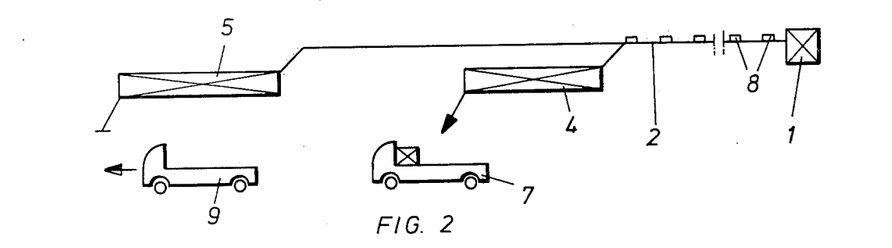
FIG. 2 is an arrangement similar to FIG. 1 but with the operation of the loading heads having been switched.

The apparatus illustrated in FIGS. 1 and 2 shows the prior art. This apparatus includes a belt conveyor 2 receiving sacks from a supply source or filling machine 1. The conveyor 2 delivers the sacks through a deflector 3 to either a first loading device 4 or a second loading device 5. As exhibited in FIG. 1, the loading device 5 deposits the sacks onto a loading surface formed by the truck 6. At the same time, the loading device 4 is inoperative while a loaded vehicle is removed and an empty vehicle or truck 7 is moved into the loading position. In the arrangement shown in FIG. 1, the deflector supplies the sacks 8 only to the second loading device 5. When the truck 6 is fully loaded, the second device 5 is rendered inoperative and the deflector 3 switches the path of the sacks to the first loading device 4. The loading of the truck 7, previously moved into position, commences while the loaded truck 6 is removed and a new truck 9 is placed in the loading position under the second device 5.

Figure 3:
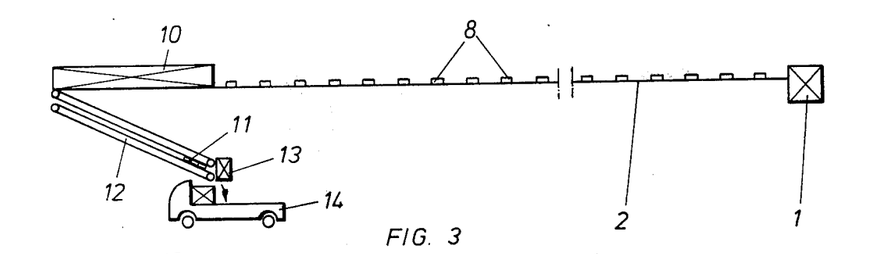
FIG. 3 is a schematic showing of an apparatus embodying the present invention and including a device for forming the sacks into layers, a belt conveyor for receiving a layer from the device and delivering it to another device which, in turn, places the layer onto a loading surface.
Figure 4:
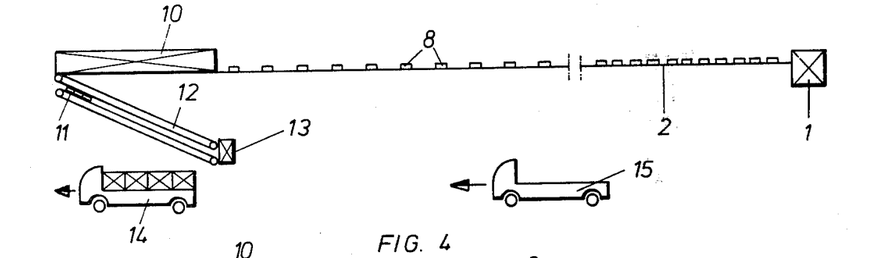
FIG. 4 is an arrangement similar to that shown in FIG. 3 when the loading surface is being replaced.
Figure 5:
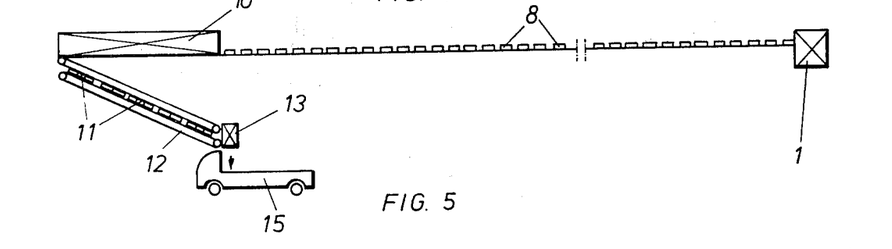
FIG. 5 is a view similar to that shown in FIGS. 3 and 4 with the empty loading surface moved into position below the loading device.
Figure 6:
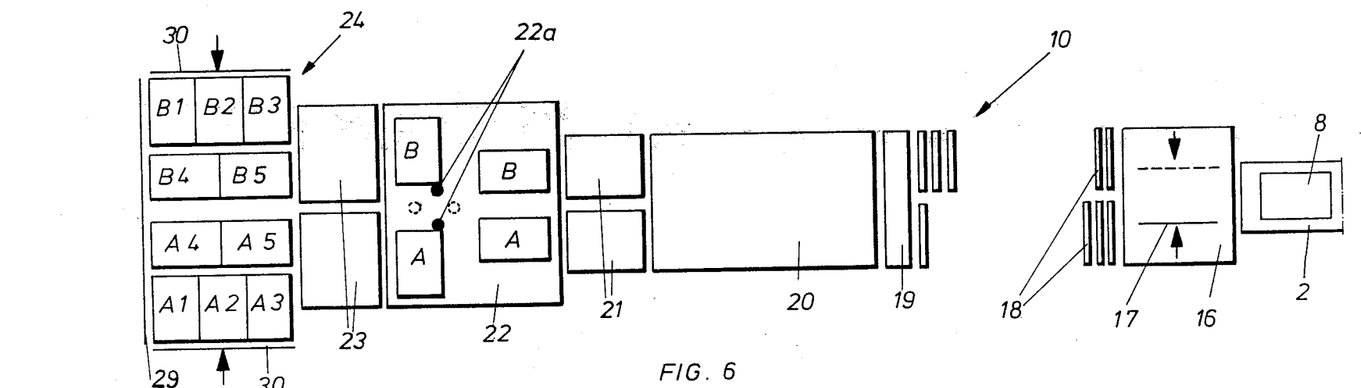
FIG. 6 is a schematic top view of the device for forming the sacks into a layer in accordance with the present invention.
Figure 7:
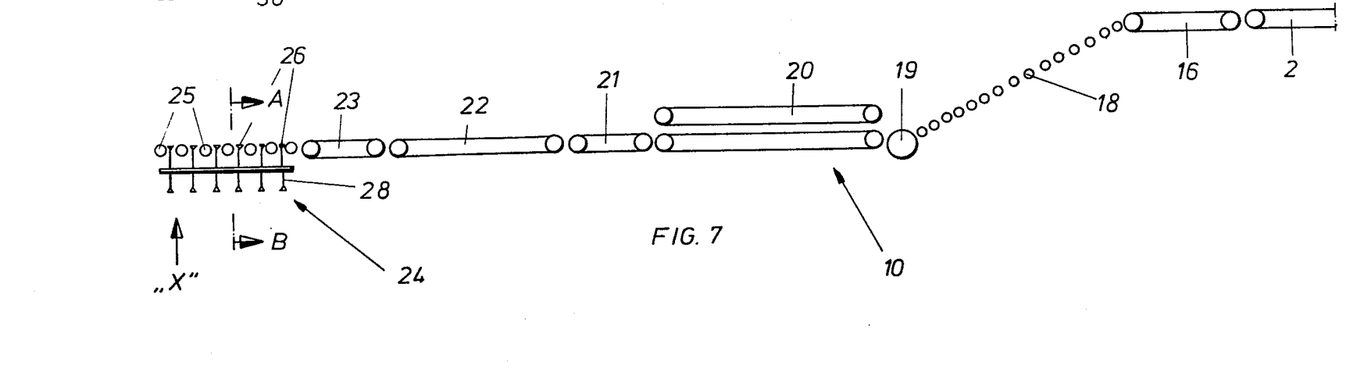
FIG. 7 is a side view of the device illustrated in FIG. 6.

In FIGS. 3 to 5 an apparatus embodying the present invention is illustrated, which provides a simplified loading operation as compared to that disclosed by FIGS. 1 and 2. This apparatus is similar to that in FIGS. 1 and 2 in that a belt conveyor 2 moves sacks 8 from a sack-filling machine 1 to a device 10 forming the sacks into layers. Subsequently, the formed layers 11 pass over another belt conveyor 12 which is a double belt and can act as a storage member. As the individual layers 11 move from the storage belt conveyor 12, they are charged onto the loading surface on truck 14 by means of a device 13. The details of the various parts of the apparatus will be set forth in detail later. For the present, the apparatus in FIGS. 3 to 5 illustrates the operation in which conveyor 2 moves the sacks at a speed of 1 m/sec., with the output of the sack-filling machine 1 being 2000 sacks/hour. Accordingly, the length of the belt 2 is 90 m and its normal operating speed can be reduced from 1 m/sec. to 0.75 and 0.5 m/sec. Accordingly, the normal operating speed of the belt 2 of 1 m/sec. and at an output of the sack-filling machine 1 of 2000 sacks/hour, the distance between the sacks moving along the belt is 1.8 m between the front edges of adjacent sacks and, therefore, with the sacks being 0.6 m long, the space between two adjacent sacks is 1.2 m and, moreover, 50 sacks are positioned on the 90 m length of the conveyor 2.

The device 10 for forming the sacks into layers 11 can be controlled to increase from the normal operating speed where 2000 sacks/hour are handled to higher operating speeds of up to 3000 sacks/hour or the device can be adjusted to operate at this maximum speed from the outset.

The storage belt conveyor 12 is dimensioned and driven so that it usually delivers a layer 11 of sacks to the device 13 before it receives another layer from the device 10. The conveyor 12, however, can be stopped by suitable control means each time after it receives a layer of sacks. By moving the conveyor 12 in a step-wise manner, it can be filled for its entire length with layers of sacks one immediately following the other, as shown in FIG. 5. In other words, the conveyor 12 is advanced during each step by an amount just sufficient to receive one layer of sacks. For example, it is assumed that the storage capacity of the belt conveyor 12 is five layers of ten sacks each making its total storage fifty sacks. Based on this description, the various operations shown in FIGS. 3 to 5 will now be explained in more detail.

As shown in FIG. 3, the truck 14 is loaded with 2000 sacks/hour at a speed of the first conveyor 2 of 1 m/sec. When the truck 14 is fully loaded and a layer 11 of sacks has just passed from the conveyor 12 and the device 13, the belt 12 is completely empty and the speed of the first conveyor is reduced to 0.5 meters per second so that the fifty sacks 8 on this conveyor are passed to the device 10 for forming layers at a speed of only 1000/hour rather than at 2000 sacks/hour. During this period the second or storage belt conveyor 12 is moved in a step-wise manner as it receives each layer from the device 10. Accordingly, to fill the storage conveyor 12 completely, it requires 3.6 seconds/sack times 50 sacks, that is, 180 seconds or 3 minutes. As a result, a three-minute period is available for removing the fully loaded truck 14 and for replacing it with an empty truck 15. Adjustment of the device 10 which forms the layers is not necessary, since it automatically operates at a slower rate due to usual feedback control.

When the empty truck 15 reaches the loading position, the first belt conveyor 2 is switched to a speed of 0.75 m/sec. and the second belt conveyor 12 is operated in a step-wise manner so that, while simultaneously increasing the speed of the device 10 forming the layers and the device 13 charging the layers to the loading surface, the individual layers are discharged from the conveyor 12 at a faster rate than the rate at which layers are received from the device 10. The apparatus operates during this phase with 100 sacks being delivered through the apparatus at the rate of 3000 sacks per hour. As soon as the last sack has been placed upon the first conveyor 2 with a small space from the preceding sack, with the conveyor operating at a speed of 0.5 m/sec., the speed of the conveyor 2 is increased again to 1 m/sec. and the device 10 forming the layers is, during this period of operation, charged at the rate of 2500 sacks/Hour. Accordingly, the operating speed of the device 10 can be changed, however, the change may not be required because of the above-mentioned feedback control means, until all the sacks have been discharged which were received by the first conveyor 2 while it operated at a speed of 0.75 m/sec. At this point, further delivery of the sacks to the device 10 takes place with the normal distance between the sacks and the first conveyor operating at a rate of 2000 sacks/hour. The operating speeds of the layer forming device 10 and the loading device 13 are controlled accordingly. The loading operation continues until the truck 15 is completely filled and, subsequently, until the new loading surface is introduced to the device 13, the adjusted operational control is repeated.

Figure 8:
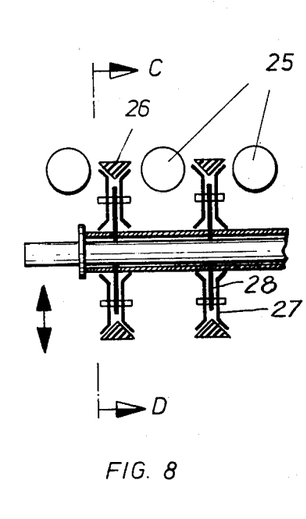
FIG. 8 is a partial sectional view of a cross-conveyor used in the device shown in FIGS. 6 and 7.
Figure 9:
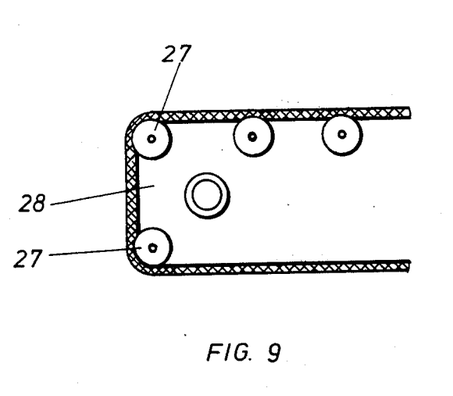
FIG. 9 is a sectional view taken along the line C-D in FIG. 8.
Figure 10:
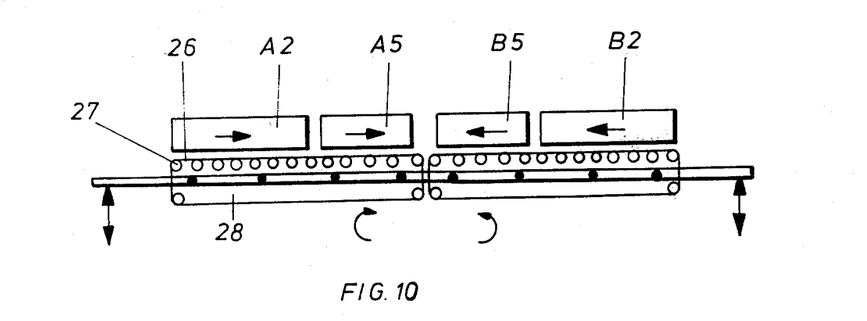
FIG. 10 is a sectional view taken along the line A-B in FIG. 7.

In the apparatus displayed in FIGS. 6 to 15, illustrating, in general, the apparatus in FIGS. 3 to 5, but in more detail, the first conveyor 2 has its delivery end located at the device 10 for forming layers. The first conveyor 2 delivers the sacks to a belt 16 on which a slider 17 is positioned for movement transversely of the direction of movement of the conveyor 2. Belt 16 supplies the sacks 8 from the first conveyor 2 in an alternating pattern to a pair of parallel gravity-roller conveyors 18. Following the gravity-roller conveyor 18 is a roller 19 and a double belt member 20. The roller 19 and double belt 20 move the sacks along the same direction as that of the first conveyor 2. From the downstream end of the double belt 20, the sacks 8 are conveyed to a pair of parallel synchronized belts 21 which ensure simultaneous delivery of the sacks to a turning device 22 provided with a pair of turning pins 22a. As illustrated, the turning pins can be moved between the inoperative positions shown dotted and the operative positions shown in solid black. With the turning pins 22a in the operative position the sacks A and B moving over the turning device 22 are turned through 90° so that the long axis of the sacks extends transversely of the direction of movement of the device 10. When the pins 22a are in the inoperative position, the sacks A and B move over the device 22 with their long dimension extending in the same direction as movement over the device 10. From the turning device 22, the sacks are moved onto the synchronized belts 23. The synchronized belts 23 ensure that the sacks are charged simultaneously to the cross-conveyor 24. As illustrated in FIG. 8, the cross-conveyor 24 includes conveying rollers 25 for moving the sacks in the feed direction of device 10 and key-shaped conveyor belts 26 provide transverse movement of the sacks. The conveyor belts 26 are trained over drivable belt pulleys 27 mounted on supporting plates 28, note FIGS. 8-10. As can be seen in these figures, the supporting plates 28 are positioned between adjacent conveying rollers 25 and can be raised and lowered, as desired. Further, the conveyor belt 26 and supporting plate 28 are divided into two groups each on an opposite side of the longitudinal median plate of the device 10. Accordingly, the two groups can be driven in the same or in opposite directions, note in FIG. 10 the arrows show the sacks being moved in opposite directions. In addition, a stop plate 29 extending transversely across the leading end of the cross-conveyor 24 and pressing plates 30 extending in the direction of the movement of the device 10 are located along the sides of the cross-conveyor and all of these plates can be moved vertically.

The device just described operates in the following manner: initially the conveying rollers 25 deliver the rows of sacks A1, A2, A3 and B1, B2, B3 from the pair of synchronized belts 23 into contact with the stop plate 29 and then the conveyor belts 26 are moved upwardly between the conveyor rollers and are driven in opposite directions until each of the rows of sacks A1, A2, A3 and B1, B2, B3 contact the oppositely disposed pressing plates 30. After the conveyor belts 26 are lowered into the inoperative position, the rows of sacks A4, A5 and B4, B5 are moved onto the cross-conveyor and the conveyor belts are again raised into the operative position and driven in opposite directions, but the reverse of the previous direction of movement, so that the four rows of sacks are moved together to a compact arrangement. If necessary, the layer 11 of sacks can be made more compact by means of the pressing plates 30.

The layer 11, consisting of 10 sacks, can be transported in the normal direction of the device 10 by lifting the stop plate 29 with the movement being effected by the conveying rollers 25. Alternatively, by raising one of the pressing plates 30 and moving the conveyor belts 26 in the same direction, the layer can be moved transversely from the cross-conveyor 24.

This device 10 for forming a layer of sacks can be used essentially unchanged for all of the following embodiments, for example, with the embodiment illustrated in FIGS. 11 to 15. In this embodiment, the downstream end of the device 10 incorporates a conveying surface 31 which can be moved in the vertical direction and is arranged to receive a layer of sacks from the cross-conveyor 24. After a layer 11 is displaced from the cross-conveyor 24 in the longitudinal direction of the device 10 onto the conveying surface 31, the conveying surface is lowered, as shown in dotted lines in FIG. 11, and the layer is transported onto the storage or double belt conveyor 12 shown in more detail in FIG. 11 with the layer just having been introduced into its inlet end. The double belt conveyor 12 is pivotally mounted on a cantilever beam 32 secured to a carriage frame 33 on which the device 10 is supported. Accordingly, the conveyor 12 can be pivoted in a vertical plane. The carriage frame is supported on rollers 34 for movement in its longitudinal direction so that, for example, it can be positioned exactly for charging layers of sacks onto a truck 42. More importantly, however, the carriage frame 33 can be moved over the loading surface by the length of one layer or stack for commencing a new stack after a previous stack has been completed.

Figure 11:
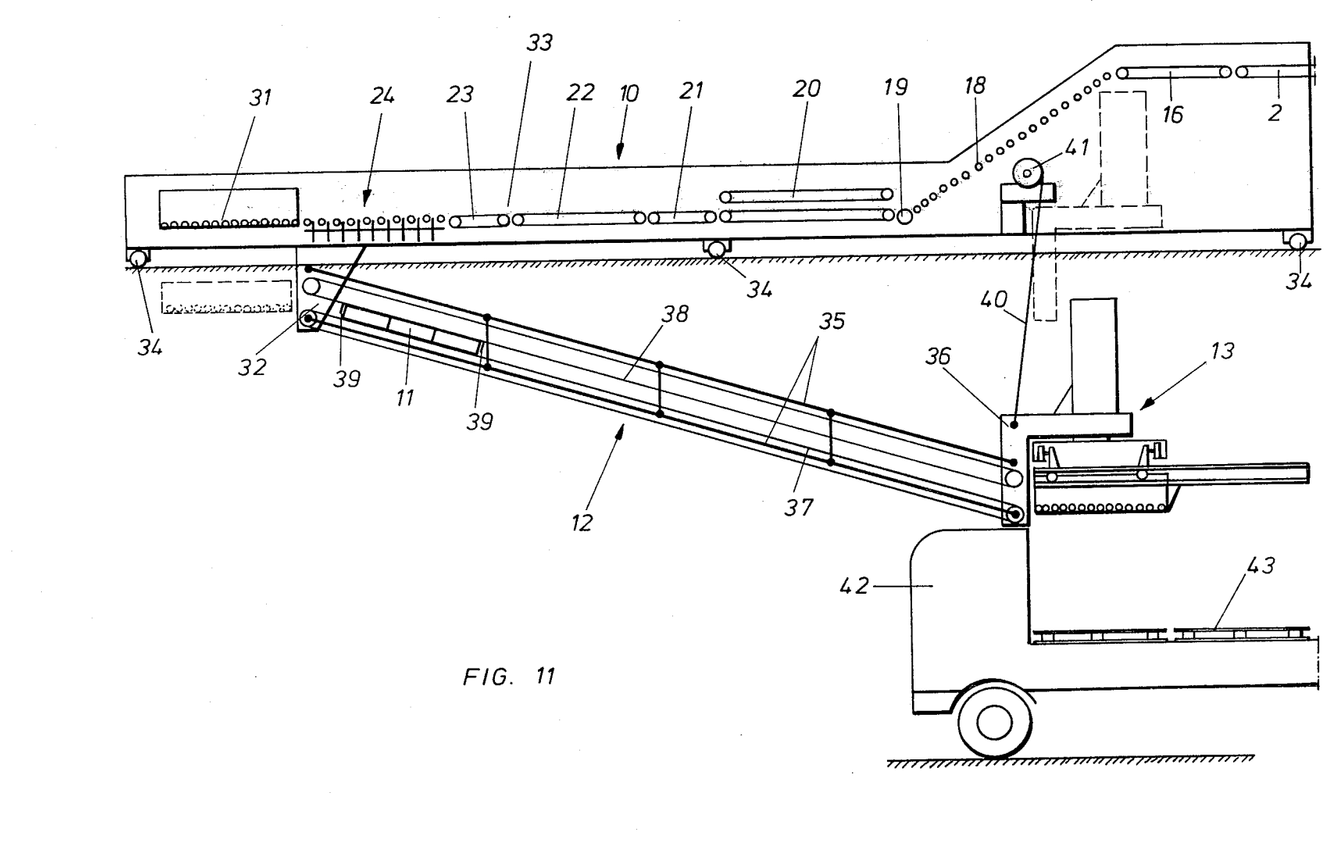
FIG. 11 is an enlarged side view disclosing details of the apparatus illustrated in FIGS. 3 to 5.

Storage belt conveyor 12 includes upper and lower parallel guides 35 which are pivoted at one end to the cantilever beam 32 and at the other end to a frame 36 forming a part of the device 13 for charging the layers onto the loading surface. Each layer 11 passes from the device 10 into the double belt conveyor 12 and is supported between a lower belt 37 and an upper belt 38 with stop spacers 39 extending downwardly from the upper belt 38 into the path of the layer 11. Due to the stop spacers 39, even though the double belt 12 is positioned at a steep incline, the layer 11 cannot separate.

A traction cable 40 connected to a drivable drum 41 located on the carriage frame 33 supports the frame 36. Since the frame 36, in turn, supports the downstream or outlet end of the double belt conveyor 12, the conveyor along with the device 13 can be moved in the vertical direction.

The device 13 which places the layers on the loading surface, as shown in FIG. 11, will be explained in greater detail based on the illustrations in FIGS. 12 to 15. With regard to FIG. 11, the device 13 forms stacks consisting of individual layers 11 on the support surface afforded by the vehicle 42. As shown, the vehicle can only be loaded from the top and its loading surface contains pallets 43 on which the stacks are formed.

Figure 12:
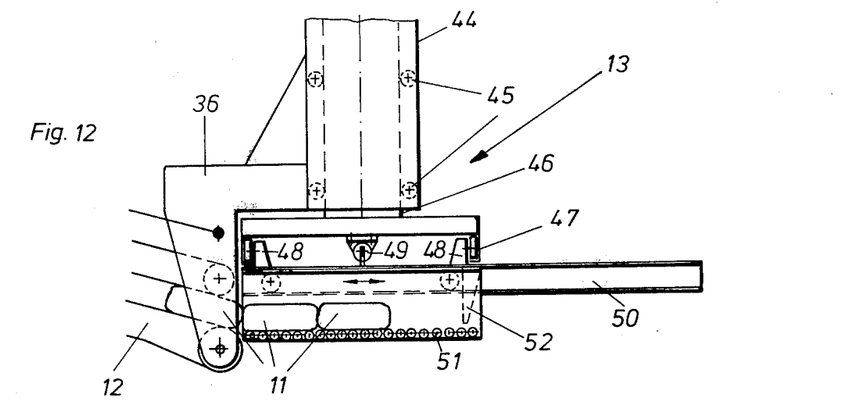
FIG. 12 is an enlarged side view of the device illustrated in FIG. 11 for placing layers of sacks onto the loading surface with the device shown receiving a layer of sacks from the belt conveyor.

As shown in FIG. 12, the device 13 includes a vertical guide tube 44 containing guide rollers 45 mounted on the frame 36. A support column, located within the guide tube 44, can be raised or lowered by a driving device, not shown. At the lower end of the support column 46, guide rails 47 are provided which extend transversely of the direction of movement of the layer of sacks 11 onto a carriage 48 supported on the guide rails 47. The carriage 48 can be moved along the rails 47 by means of a hydraulic press 49. Further, longitudinally extending guide rails 50 are provided on the carriage 48 extending in the direction of movement of the layer 11 onto a support surface 51 formed by a plurality of rollers. These rollers can be driven.

Figure 13:
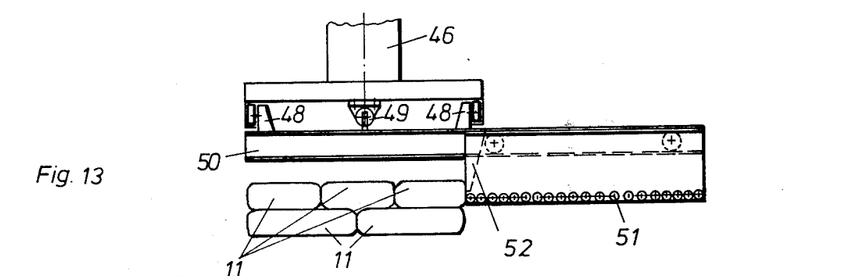
FIG. 13 is a view similar to that in FIG. 12 showing a portion of the device delivering the layer of sacks onto a layer already deposited on the loading surface.
Figure 14:
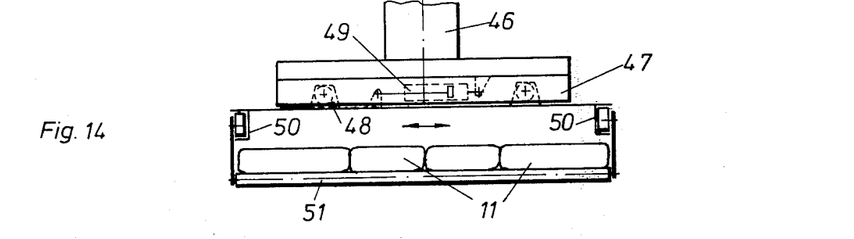
FIG. 14 is a view taken at 90° to the views shown in FIGS. 12 and 13.
Figure 15:
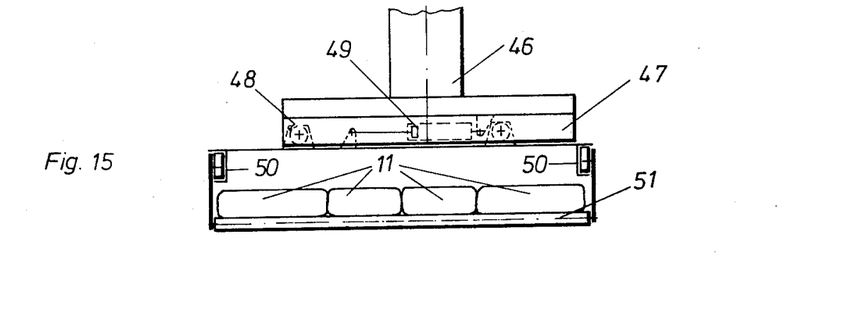
FIG. 15 is a view similar to FIG. 14 with the device moved laterally.

As viewed in FIGS. 12 to 15, starting with FIG. 12, a layer 11 of sacks is transported from the double belt conveyor 12 onto the support surface 51 until the leading sacks of the layer contact a stop member 52 secured to the rails 50 and extending downwardly into the path of movement of the layer. Subsequently, by lowering the support column into position to deposit the layer either directly on the loading surface or onto a layer previously positioned thereon, as shown in FIG. 13, the support surface 51 is moved along the rail 50 to the right in FIG. 13, and the stop member 52, located in the path of the layer 11, displaces it from the support surface onto the loading surface. The carriage 48 can be moved along the transverse guide rails 47 so that the support surface 51 can be exactly aligned with a pallet on the loading surface, note this transverse movement as shown in FIGS. 14 and 15.

Figure 16:
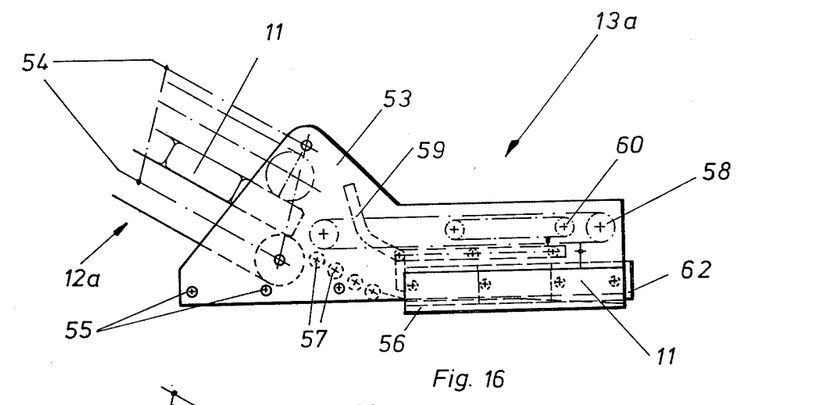
FIG. 16 is a schematic side view of another embodiment of the device for supplying layers onto the loading surface.
Figure 17:
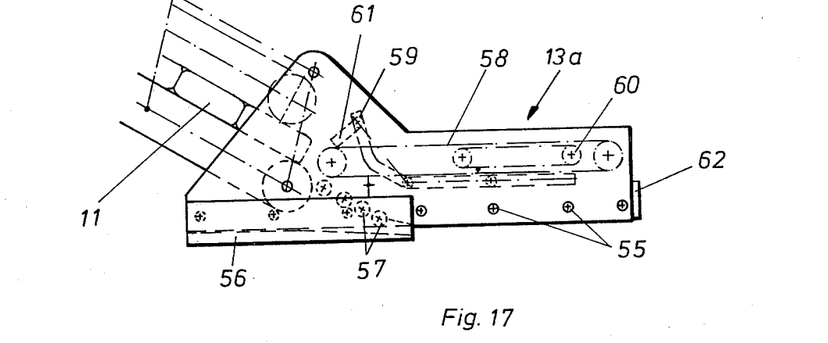
FIG. 17 is a view similar to FIG. 16 with the device in position to receive a layer of sacks from the conveyor.
Figure 18:
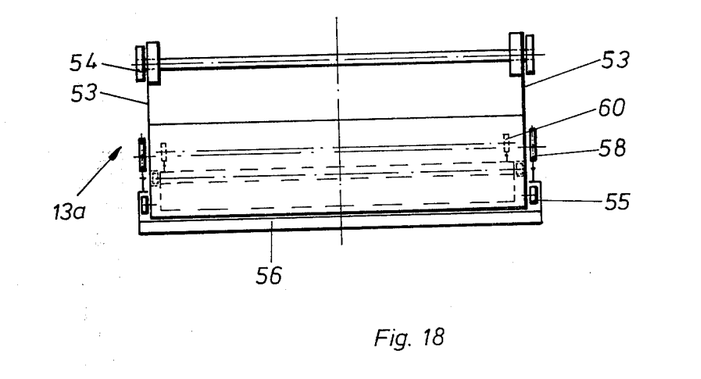
FIG. 18 illustrates the device in FIGS. 16 and 17 taken normal to such views.
Figure 19:
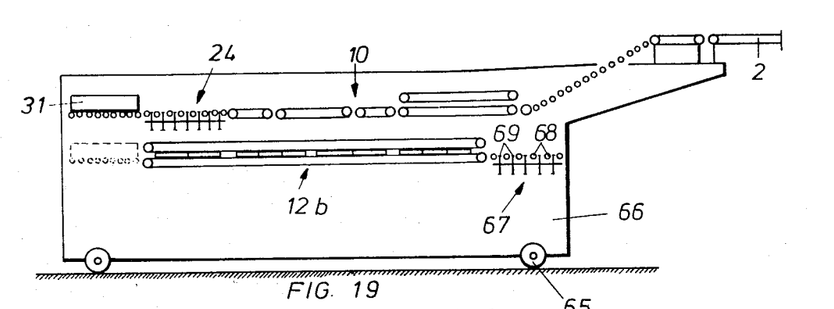
FIG. 19 is a side view of a device for charging the loading surface from its side.
Figure 20:
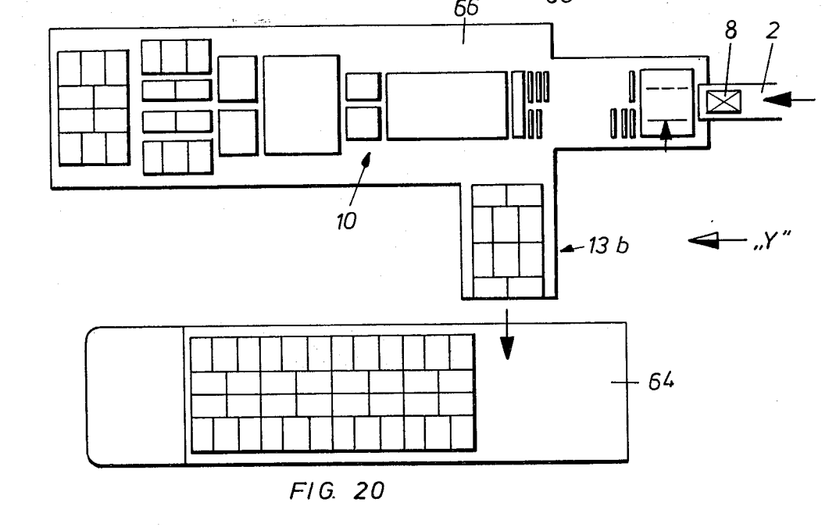
FIG. 20 is a top view of the device illustrated in FIG. 19.

In FIGS. 16 to 18 a simplified embodiment of a device 13a is illustrated for delivering layers from the double belt conveyor 12a to the loading surface. The device 13a includes a frame 53 positioned at the discharge end of the conveyor 12a. The frame 53 is pivoted to a parallelogram arrangement of guides 54 at the discharge end of the conveyor 12a so that the frame can be maintained in position in space when the conveyor is pivoted in a vertical plane. Rollers 55 are provided on the frame 53 for the movement of a support surface in the same direction as the movement of the layer 11 from the conveyor 12a. Transfer rollers 57 are provided between the downstream end of the conveyor 12a and the support surface 56. A chain drive 58 moves the support surface in its longitudinal direction. In addition, connecting link guides 59 are positioned on the frame 53 and support a slide stop 61 which is movable via a chain drive 60. The slide stop can be moved between the end positions shown in FIGS. 16 and 17. At the opposite end of the frame 53 from the conveyor 12a, a transversely extending top member 62 is positioned.

In the embodiment displayed in FIGS. 16 to 18, the support surface 56 is movable between a first loading position in FIG. 17 and an unloading position in FIG. 16. In FIG. 17, when the slide stop 61 is pivoted out of the path of a layer 11 coming from the conveyor 12a, the layer moves onto the support surface 56 over the intermediate rollers 57. As the layer starts to move onto the support surface 56, the surface is displaced by its drive at the same speed as the layer of sacks is transported from the conveyor 12a. After the last one of the sacks in the layer 11 has been deposited on the support surface 56, the slide stop 61 is moved by its drive 60 from the inoperative position shown in FIG. 17 to the operative shown position in FIG. 16 permitting the completion of the movement of the layer 11 on the support surface 56 into contact with the stop member 62. By moving the support surface 56 back to the position shown in FIG. 17, the layer 11 on the support surface is displaced by the slide stop 61 onto the loading surface.

Another arrangement of the apparatus embodying the present invention is illustrated in FIGS. 19, 20 and 22, 23 for charging the loading surface from a lateral position, that is, onto a truck 64 on which pallets 63 are positioned. The entire apparatus is mounted on a carriage frame 66 which is movable in its longitudinal direction by means of rollers 65. The device 10 for forming the layers 11 corresponds to the device previously described with respect to the showing in FIGS. 6 to 11. Accordingly, the layer forming device 10 is not described in detail. At the outlet end of the cross-conveyor 24, similar to the arrangement shown in FIG. 11, there is a vertically movable conveying surface 31 for delivering a layer 11 of sacks to a double belt conveyor 12b which conveys the layer in the opposite direction to the direction of movement of the sacks over the device 10. The conveyor 12b extends horizontally and is in a stationary position below the device 10. At its discharge or outlet end, the double belt conveyor 12b supplies the formed layers to a cross-conveyor 67. The cross-conveyor 67 includes conveying rollers 68 for moving the layer in the same direction as the conveyor 12a and cross-conveyor belts 69 located between the rollers so that the belts can be lifted and lowered in the same manner as described above for the cross-conveyor 24. At one side of the cross-conveyor 67 is a device 13b for introducing the layers of sacks onto the loading surface. The device 13b can be moved vertically and also perpendicularly to the direction of movement of the conveyor 12b with this movement taking place over rails 70. The rails 70 can be moved in the vertical direction along vertical guide rails 71. The rails 70 can be lifted to a height of one stack of the layers by means of guide rollers 72 and driving means, not shown. A carriage 73 can be moved along the rail 70, note FIGS. 22 and 23. Positioned on the carriage 73 is a drivable conveying surface 74 which receives the layers 11 discharged from the cross-conveyor 67. Further, by means of the conveying surface 74, each layer 11 of sacks can be moved into a position above the pallets 63 on the truck 64. Subsequently, a stop member 75, which is variably positionable, can displace the layer 11 from the conveying surface 74 as the carriage is retracted from the position in FIG. 22 for displacing the layer onto the pallets on the truck 64.

Figure 21:
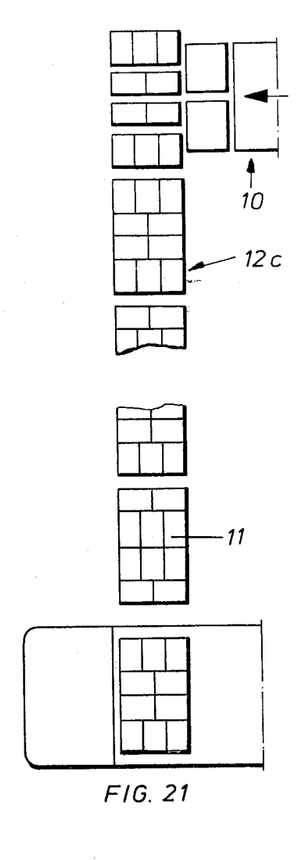
FIG. 21 is a top view of another embodiment of the device for the side loading of the loading surface.
Figure 22:
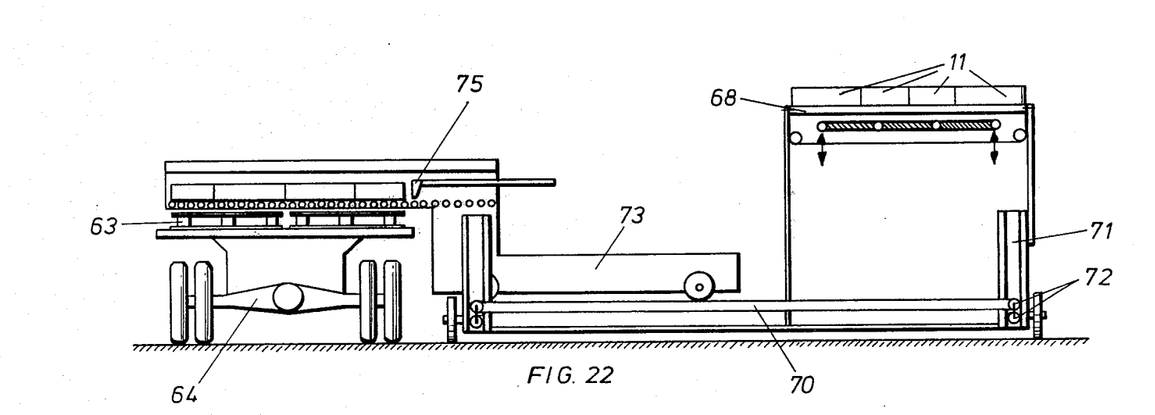
FIG. 22 is a view of the device shown in FIGS. 19 and 20 taken in the direction of the arrow Y of FIG. 20 with the device in position for depositing a layer of sacks on the loading surface.
Figure 23:
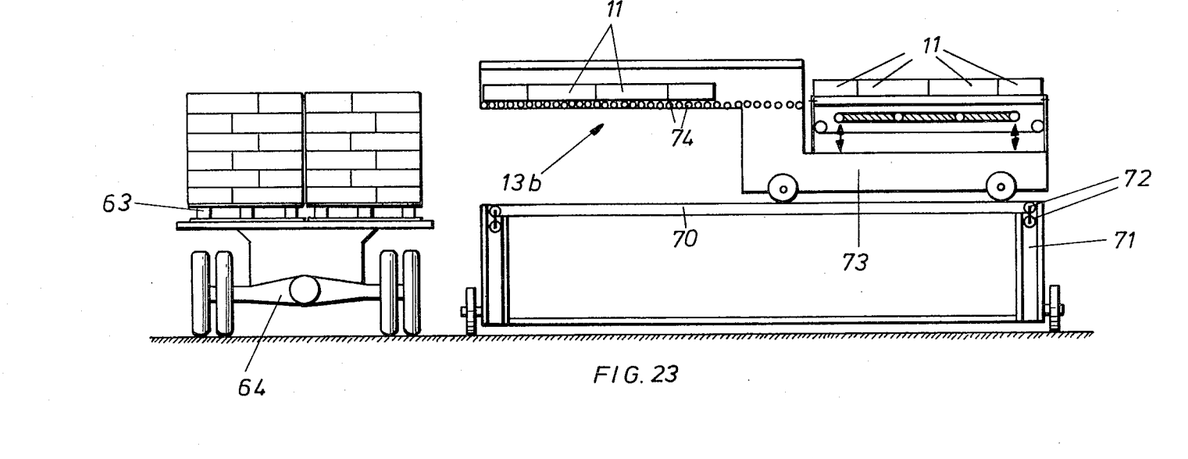
FIG. 23 is another position of the device shown in FIG. 22.

The arrangement illustrated in FIG. 21 shows schematically that a storage belt conveyor 12c can be positioned at right angles to the device 10 for forming layers and can be connected directly to the device. In principle, the device 13b, as shown in FIGS. 22 and 23, can be serially connected to the conveyor 12c, however, this is not shown in detail in FIG. 21.

Figure 24:
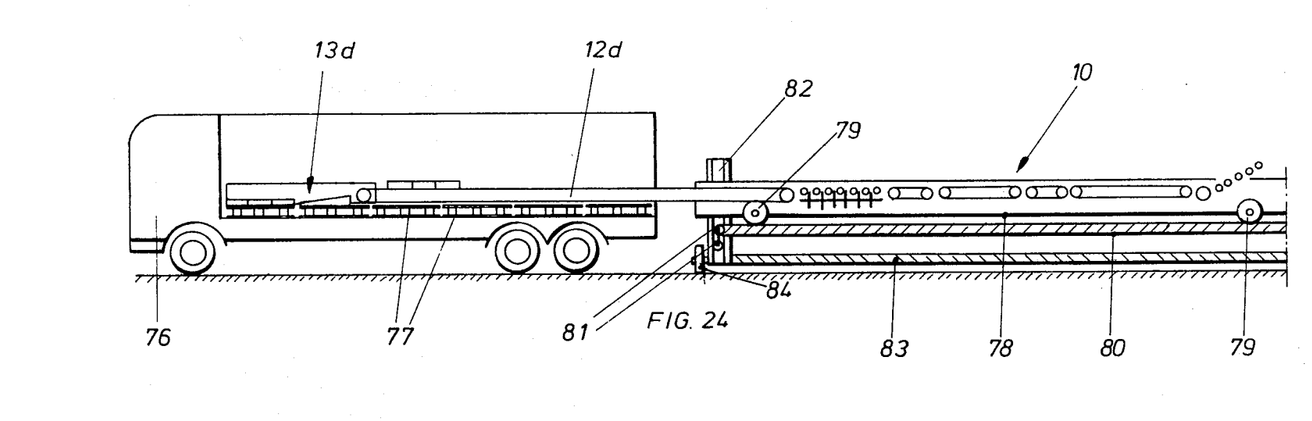
FIG. 24 is a side view of still another embodiment of the device for supplying layers onto the loading surface where the supply takes place longitudinally onto the front end of the loading surface.
Figure 25:
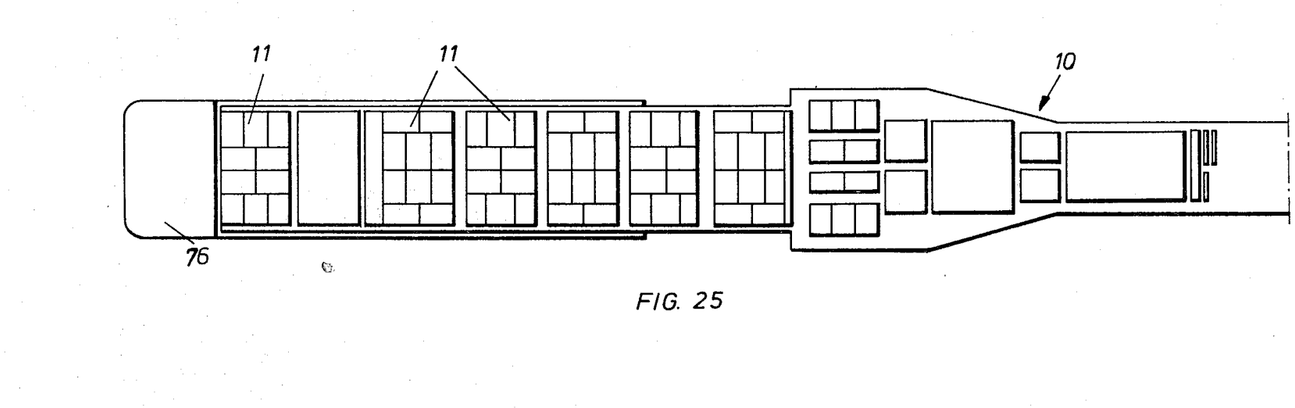
FIG. 25 is a top view of the device illustrated in FIG. 24.

To complete the description of the various arrangements of the apparatus embodying the present invention, FIGS. 24 and 25 illustrates a device for charging the layers to the front or rear of a loading surface with the loading surface consisting of a truck 76 with pallets 77. A horizontally arranged storage belt conveyor 12b consists of a single lower belt extending in the direction of movement of device 10, as described above, for forming layers. The device 10 and the conveyor 12b are both positioned on a carriage frame 78. The carriage frame is movable in its longitudinal direction over rollers 79 on rails 80. The rails 80 are vertically movable in vertical guide rails 82 by means of guide rollers and driving means, not shown, and this arrangement is mounted on a base frame 83 movable in the transverse direction via rollers 84. The storage belt 12b is arranged to cantilever over the maximum length of the loading surface. At its outlet end, the conveyor 12b supplies layers of sacks to a device 13b constructed similarly to the device 13a shown in FIGS. 16 to 18. Accordingly, the device 13b is not described in detailed.

As can be noted in FIGS. 24 and 25, the truck 76 can be fully loaded in the manner described above without moving the loading surface, that is, the truck 76.

It can be appreciated that a plurality of modifications or combinations of the individual parts of the apparatus described above can be provided without deviating from the basic concept embodying the invention. The inventive concept consists primarily in providing a storage capacity on the conveyor receiving the layers from the device 10 so that the apparatus can be operated continuously without requiring two separate loading devices with the necessary controls.

What is claimed is:

1. Apparatus for conveying sacks or the like from a supply source to a loading surface, for forming layers of the sacks and for stacking the layers directly on the loading surface or one on top of the other, comprising first means for conveying sacks from the supply source, second means arranged to receive a plurality of sacks from said first means for forming the sacks into a layer, third means for conveying the layers of sacks from the second means, and fourth means for receiving the layers of sacks from said third means and for placing the layers in a stacked arrangement on the loading surface, wherein the improvement comprises that said third means are variably operable for continuously delivering layers of sacks to said fourth means during normal operation and during the replacement of the loading surface for movement in a step-wise manner for receiving and retaining a number of layers thereon so that said first and second means continue to operate until a new loading surface is positioned to receive the layers of sacks from said fourth means, and said fourth means are variably operable for changing the speed at which layers of sacks are transferred from said third means to the loading surface.

2. Apparatus, as set forth in claim 1, wherein said first means can be operated at a variety of speeds for normal operation and for operation during the period when a loaded loading surface is removed and an unloaded loading surface is positioned at said fourth means for restarting the loading operation.

3. Apparatus, as set forth in claim 2, wherein said second means are operable at variable speeds for accommodating the various operating conditions of said first means and of said third means during normal operating conditions and during a changeover of the loading surface.

4. Apparatus, as set forth in claim 1, wherein said third means comprises a double belt conveyor having a first end for receiving a layer of sacks from said second means and a second end for discharging a layer of sacks to said fourth means, said double belt conveyor is pivotally supported at the first end thereof for pivotal movement in a vertical plane.

5. Apparatus, as set forth in claim 4, wherein said double belt conveyor comprises an upper belt and a lower belt stop members attached to at least one of said upper and lower belts and extending transversely of the direction of movement of said conveyor between the first and second ends thereof, and said stop members being spaced apart in the direction of movement of said conveyor between the first and second ends thereof by a dimension corresponding to the dimension of a layer of sacks extending in the same direction.

6. Apparatus, as set forth in claim 1, wherein said third means comprises a horizontally arranged first conveyor, said first conveyor having a first end arranged to receive layers of sacks from said second means and an opposite second end, a second conveyor located at the second end of said first conveyor for receiving layers of sacks therefrom and for moving the sacks in the layer in a direction perpendicular to the direction of movement of said first conveyor from the first to the second end thereof, and said fourth means located adjacent said second conveyor at the end thereof spaced from said first conveyor, said fourth means comprising a vertically movable device for receiving layers of sacks from said second conveyor and for transporting the layers in a direction transversely of the direction of vertical movement of said device.

7. Apparatus, as set forth in claim 3, including a first carriage frame supporting said second means and said third means, said third means comprising a horizontally extending conveyor belt, said fourth means comprising a base frame, a second carriage frame mounted on said base frame and a horizontal conveyor mounted on said second carriage frame, said base frame being movable in a horizontal direction, said second carriage frame being movable in the horizontal direction transversely of the horizontal direction of movement of said base frame, and means on said base frame for moving said second carriage frame in the vertical direction, said horizontal conveyor arranged to cantilever outwardly from said second carriage frame over a loading surface.

8. Apparatus, as set forth in claim 3, wherein said second means is arranged to move sacks in a main longitudinal direction and comprises a pair of parallel belt conveyors arranged to receive individual sacks from said first means and to move the sacks in the main longitudinal direction, pins movably positionable into the path of sacks conveyed by said pair of belt conveyors for selectively turning the sacks through 90°, a cross-conveyor located downstream of said pins and arranged to receive the sacks after they pass said pins, said cross-conveyor having a plurality of first conveying elements and a plurality of second conveying elements, said first conveying elements arranged to move the sacks in the main longitudinal direction, and said second conveying elements divided into two groups and arranged for moving sacks transversely of the main longitudinal direction, said two groups of said second conveying elements being divided one on each side of a median line extending in the main longitudinal direction and said second conveying elements in each of said two groups being selectively movable in the same direction and in opposite directions.

9. Apparatus, as set forth in claim 8, wherein said second conveying elements comprise a plurality of drivable belt pulleys and belt conveyor members trained over said pulleys, support plates mounting said belt pulleys between adjacent said first conveying elements, said support plates being movable in the direction perpendicular to and across the direction of movement of sacks by said first conveying elements so that said second conveying elements can be moved into and out of the path of sacks travelling over said first conveying elements.

10. Apparatus, as set forth in claim 3, wherein said third means comprises a belt conveyor having a first end for receiving layers of sacks from said second means and a second end for supplying the layers of sacks to said fourth means, said fourth means comprises a frame attached to the second end of said belt conveyor, a support column mounted on said frame and being movable relative thereto in the vertical direction, horizontally extending first guide rails supported on the lower end of said support column, said first guide rails extending transversely of the direction of movement of the layers of sacks onto said fourth means, a carriage supported on said first guide rails and including horizontally extending second guide rails disposed transversely of said first guide rails, a movable support surface mounted on said second guide rails and having a loading position where it receives a layer of sacks from said third means and an unloading position where it discharges the layer of sacks to a loading surface, and a stationary stop member mounted on said second guide rails and positioned in the path of the layer of sacks positioned on said support surface, said support surface being movable relative to said stop member so that as said support member is moved from the loading position to the unloading position relative to said stop member, said stop member displaces the layer of sacks from said support surface to the loading surface.

11. Apparatus, as set forth in claim 3, wherein said third means comprises a belt conveyor having a first end for receiving a layer of sacks from said second means and a second end for delivering the layer of sacks to said fourth means, said fourth means comprising a frame secured to the second end of said belt conveyor, a support surface for receiving a layer of sacks from said belt conveyor mounted on said frame and being movable thereon between a first position and a second position, a first stop member mounted on said frame and being movably positionable between a first position out of the path of movement of the layers of sacks onto said support surface and a second position in the path of movement of the layer of stacks on the support surface, said support surface being loaded with the layer of sacks as it moves from the first to the second position with said stop member in the first position and as said support surface moves into the second position said first stop member moves into the second position and by moving said support surface from the second position to the first position, said stop member displaces the layer of sacks from said support surface onto the loading surface.

12. Apparatus, as set forth in claim 11, wherein said frame includes a second stop member attached to said frame at a position spaced from the second end of said belt conveyor and extending transversely of the path of movement of said support surface between the first and second position thereof, said second stop member being located downstream from said first stop member in the direction of movement of said support surface from the first to the second positions, said second stop member forming a stop for the layer of sacks moved into the second position and said first stop member being movable into the second position for moving the layer of sacks on said support surface into contact with said second stop member.

* * * * *